(12) United States Patent
Kim et al.

(10) Patent No.: US 8,553,163 B2
(45) Date of Patent: Oct. 8, 2013

(54) DISPLAY APPARATUS AND METHOD FOR MANUFACTURING THE SAME

(75) Inventors: Sang-Jae Kim, Seongnam-si (KR); Seung-Boem Park, Seoul (KR); Seung-Hee Lee, Seoul (KR); Kwang-Hyun Kim, Gunpo-si (KR); Ji-Hoon Kim, Hwaseong-si (KR); Tae-Ho Kim, Asan-si (KR); Beong-Hun Beon, Cheonan-si (KR); Dae-Won Kim, Dongducheon-si (KR); Gwan-Young Na, Osan-si (KR)

(73) Assignee: Samsung Display Co., Ltd. (KR)

( * ) Notice: Subject to any disclaimer, the term of this patent is extended or adjusted under 35 U.S.C. 154(b) by 216 days.

(21) Appl. No.: 13/240,105

(22) Filed: Sep. 22, 2011

(65) Prior Publication Data

US 2012/0281157 A1    Nov. 8, 2012

(30) Foreign Application Priority Data

May 4, 2011    (KR) .......................... 10-2011-0042212

(51) Int. Cl.
*G02F 1/1335*    (2006.01)
*G02F 1/133*    (2006.01)
*G02F 1/1347*    (2006.01)

(52) U.S. Cl.
USPC ............. 349/15; 349/73; 349/75; 349/130

(58) Field of Classification Search
USPC ......................... 349/15, 73, 75, 130
See application file for complete search history.

(56) References Cited

U.S. PATENT DOCUMENTS

| | | | |
|---|---|---|---|
| 6,046,849 A * | 4/2000 | Moseley et al. | 359/465 |
| 6,437,915 B2 * | 8/2002 | Moseley et al. | 359/465 |
| 2013/0107174 A1 * | 5/2013 | Yun et al. | 349/96 |

FOREIGN PATENT DOCUMENTS

| | | |
|---|---|---|
| JP | 2010-032675 | 2/2010 |
| KR | 0603455 | 7/2006 |
| KR | 0955688 | 4/2010 |

* cited by examiner

*Primary Examiner* — Mike Qi
(74) *Attorney, Agent, or Firm* — Innovation Counsel LLP (57) ABSTRACT

A display apparatus used for creating 3D images has a display panel and a phase-delaying layer disposed on the display panel. The phase-delaying layer has first and second light-changing patterns that are self-aligned to at least one of pixels and a black matrix of the display panel. The self-aligned structure is formed by selectively passing curing light (e.g., UV light) through the display panel to cure curable liquid crystal films while the films are respectively aligned by aligning layers having different alignments.

20 Claims, 9 Drawing Sheets

DISPLAY APPARATUS AND METHOD FOR MANUFACTURING THE SAME

PRIORITY STATEMENT

This application claims priority under 35 U.S.C. §119 to Korean Patent Application No. 2011-0042212, filed on May 4, 2011, in the Korean Intellectual Property Office (KIPO), the contents of which application are herein incorporated by reference in their entireties.

BACKGROUND

1. Field of the Disclosure

The present disclosure of invention relates to a display apparatus and a method for manufacturing the display apparatus, and more particularly the present disclosure relates to a display apparatus structured for displaying a stereoscopic image and a method for manufacturing the display apparatus.

2. Description of Related Technology

Recently, as demands for three-dimensional (3D) stereoscopic images, including 3D stereoscopic images in fields of games, movies and so on increase, display apparatuses for displaying 3D stereoscopic images are continuously being developed. The display apparatus for displaying the 3D stereoscopic image may be divided into a stereoscopic type and an auto-stereoscopic type according as whether or not specific spectacles are necessary.

In the stereoscopic type display apparatus, the specific spectacles, such as polarizing spectacles or liquid crystal shutter spectacles, may be used. The display apparatus having the liquid crystal shutter spectacles displays the 3D stereoscopic image by itself. Thus, the display apparatus having the liquid crystal shutter spectacles may be easily applied to a large-sized display apparatus, but since the liquid crystal shutter spectacles are expensive and an image display is delayed (e.g., because two frames often have to be serially generated, one for the left eye when its spectacle shutter is open and one for the right when its spectacle shutter is open), display quality may be decreased.

However, in the display apparatus having the polarizing spectacles, an optical plate emitting polarized light having different polarization directions is disposed on the display panel which displays a two-dimensional (2D) image, and the polarized light having the different polarization directions respectively for reaching the differently polarized lenses of the left and right eyes of an observer wearing the specialized spectacles, such is less expensive to implement. The observer perceives the 3D stereoscopic image based on the differently polarized images passing through to the left and right eyes. Since the polarizing spectacles are manufactured with a lower cost than the liquid crystal active shutter spectacles and the display quality is relatively better (e.g., only one frame can be simultaneously produced for both eyes), the display apparatus having the polarizing spectacles may be more easily commercialized.

Conventionally, in the display apparatus used with the polarizing spectacles, an optical plate having a phase-delaying layer (which creates the differently polarized light rays) is separately formed from the display panel and is attached to the display panel by an adhesive. Accordingly, the phase-delaying layer can become misaligned during manufacture or more misaligned afterwards with the display panel and a space (adhesive layer void) or changes in the adhesive layer (which is disposed between the display panel and the phase-delaying layer) can cause an undesired spatial crosstalk between the images intended respectively for the left and right eyes and thus the 3D effect is diminished.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Embodiments in accordance with the present disclosure provide a display apparatus capable of increasing aligning reliability between areas of a phase-delaying layer and a display panel, and decreasing a spatial crosstalk between the display panel and the phase-delaying layer.

According to an example embodiment, the display apparatus includes a display panel and a phase-delaying layer. The phase-delaying layer includes a base substrate, a first light-changing pattern and a second light-changing pattern. The base substrate is formed on the display panel. The first light-changing pattern is formed on the base substrate and provides a respective first phase-delaying effect to incident light incident into the display panel according to a first phase delaying-delaying direction. The first light-changing pattern includes a first cured liquid crystal. The second light-changing pattern is adjacent to the first pattern and provides a respective second phase-delaying effect to incident light according to a second phase delaying-delaying direction different from the first phase delaying-delaying direction. The second light-changing pattern includes a second cured liquid crystal.

In an example embodiment, the display panel may include a light blocking layer dividing pixels of a display area of the display panel, and a boundary between the first and second patterns may overlap with the light blocking layer.

In an example embodiment, the display apparatus may further include a polarizing plate polarizing the incident light and disposed under the base substrate.

In an example embodiment, the first and second patterns may form a stripe pattern or a checkerboard pattern.

In an example embodiment, the first pattern may include only a first cured liquid crystal. The second pattern may include both the first cured liquid crystal and a second cured liquid crystal formed on the first cured liquid crystal.

In an example embodiment, at least one of the first and second liquid crystal layers may have an inverse-wavelength dispersion characteristic.

In an example embodiment, the phase-delaying layer may include an organic material formed on the first and second liquid crystal layers, where the organic material has a flat upper surface.

In an example embodiment, the first pattern may include a first cured liquid crystal layer, and the second pattern may include a second cured liquid crystal layer. The first and second layers may be formed as coplanar parts of a substantially same layer.

In an example embodiment, the first phase-delaying direction may be different from the second phase-delaying direction by about λ/2.

According to another example embodiment, a method for manufacturing a display apparatus is provided. In the method, a curable liquid crystal is coated on the base substrate. A display panel is disposed under the base substrate. Curing light is irradiated from a lower portion of the display panel to the display panel. The display panel is driven with first and second areas divided from each other by applying a signal to the display panel, and the curing light is transmitted through the first and second area selectively. The liquid crystal is cured using the curing light selectively passing through the first area to form a first liquid crystal layer. The liquid crystal of a second area which is not cured by the light is selectively removed.

In an example embodiment, the display panel may include a light blocking layer dividing pixels of the display panel. The signal may be selectively applied with respect to the light blocking layer in driving the display panel with the first and second areas.

In an example embodiment, the method may further include disposing a polarizing plate under the base substrate.

In an example embodiment, the curing light may be initially polarized to a direction substantially perpendicular to a polarizing direction of the polarizing plate.

In an example embodiment, the first and second areas may be adjacent to each other, and form a stripe pattern or a dot pattern.

In an example embodiment, coating the liquid crystal on the base substrate includes forming a first alignment layer aligned along a first alignment direction on the first base substrate and coating the liquid crystal on the first alignment layer.

In an example embodiment, the method may further include forming a second alignment layer aligned along a second alignment direction different from the first alignment direction, coating the liquid crystal on the second alignment layer, and irradiating the light to the liquid crystal of the first and second areas, to cure the liquid crystal of the first and second areas to form a second liquid crystal layer, before coating the liquid crystal on the base substrate. The first pattern including the first and second crystal layers formed in the first area and a second pattern including the first liquid layer formed in the second area may be adjacent to each other.

In an example embodiment, at least one of the first and second liquid crystal layers may have an inverse-wavelength characteristic.

In an example embodiment, the method may further include coating an organic material on the first and second liquid layers. The organic material may have a flat upper surface.

In an example embodiment, the method may further include forming a second alignment layer aligned along a second alignment direction different from the first alignment direction on the base substrate on which the first liquid crystal layer is formed, coating the liquid crystal on the second alignment layer, irradiating the light from the lower portion of under the display panel to the display panel, driving the panel with the first and second areas divided from each other by applying the signal to the display panel, and transmitting the light through the first and second areas selectively, curing the liquid crystal using the light passing through the second area to form a second liquid crystal layer, and removing the liquid crystal of the first area which is not cured by the light. The first liquid crystal layer formed in the first area may be formed as a first pattern, the second crystal layer formed in the second area may be formed as a second pattern, and the first and second patterns are adjacent to each other.

According to present disclosure, the light blocking layer of the display panel overlaps in a self-aligned fashion with the boundaries between the first and second patterns of the phase-delaying layer, and thus aligning reliability may be increased.

In addition, the delaying-delaying layer is formed using self-aligned curing of the hardenable liquid crystals, and thus a spatial crosstalk between the display panel and the phase-delaying layer may be decreased.

BRIEF DESCRIPTION OF THE DRAWINGS

The above and other features and advantages of the present disclosure of invention will become more apparent by describing in detail embodiments thereof with reference to the accompanying drawings, in which.

DETAILED DESCRIPTION

Hereinafter, the present disclosure of invention will be further taught in detail with reference to the accompanying drawings.

Figure 1:
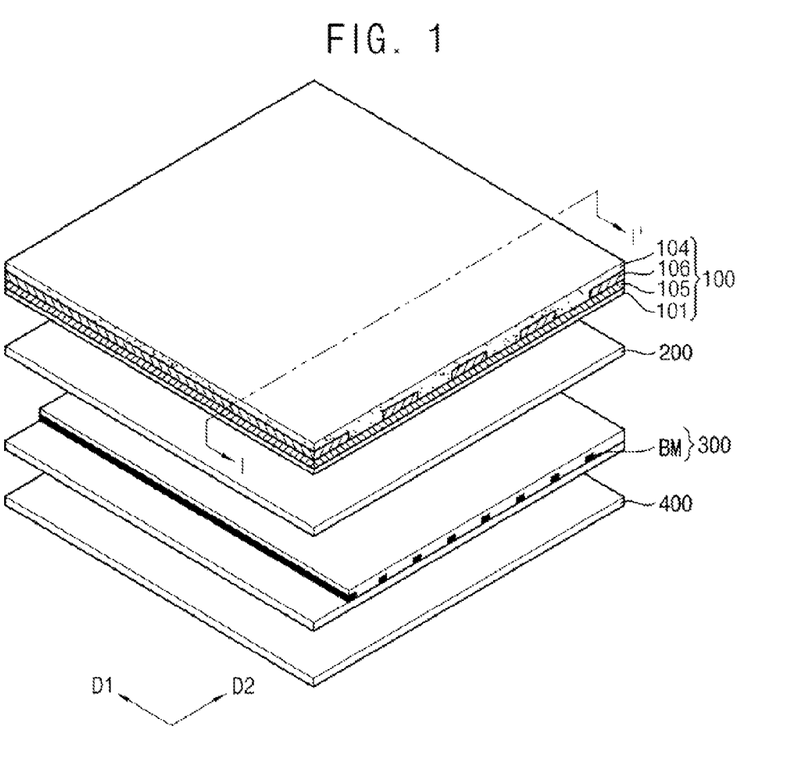
FIG. 1 is an exploded perspective view illustrating a display apparatus according to an first embodiment in accordance with the present disclosure.
Figure 2:
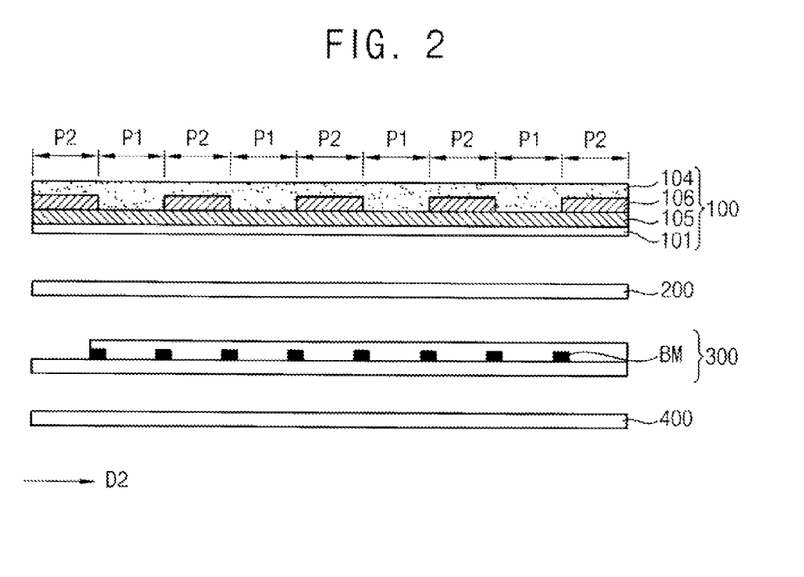
FIG. 2 is a cross-sectional view taken along a line I-I' in FIG. 1.

FIG. 1 is an exploded perspective view illustrating a display apparatus according to an example embodiment of the present disclosure. FIG. 2 is a cross-sectional view taken along a line I-I' in FIG. 1. Referring to FIGS. 1 and 2, the display apparatus includes a phase-delaying layer 100, a first polarizing plate 200, a display panel 300, a second polarizing plate 400 and a backlight assembly (not shown).

The display panel 300 forms a displayable image using an external light and electronically controlled pixels (e.g., Liquid Crystal Display (LCD) pixels). A light blocking layer BM is typically provided in the display panel 300 that blocks light from leaking through from areas between the pixels of the display panel 300. For example, in the case where the display panel 300 is a liquid crystal display (LCD) panel including a liquid crystal layer, the pixels can act as variable light polarizers that alter the polarization of light rays passing through the pixels. The display panel 300 may be disposed over the backlight assembly providing light to the display panel 300 for passing through the variable light polarizers.

The bottom or second polarizing plate 400 is disposed between the display panel 300 and the backlight assembly. The second polarizing plate 400 polarizes incident light from the backlight assembly to provide first polarized light to the bottom of the display panel 300. The second polarizing plate 400 may include a material absorbing ultraviolet rays or otherwise blocking such UV rays from passing therethrough.

The top or first polarizing plate 200 is disposed over the display panel 300, and polarizes the light provided to and through the display panel 300 to thereby provide the phase-delaying layer 100 with the light that is multiple times passed through polarizing elements (e.g., 400, 300, 200). The phase-delaying layer 100 include optical processing elements that are formed by a light which is pre-polarized to a predetermined direction and passed through the display panel 300 (which includes the BM layer) and the first (upper) polarizing plate 200. A more detailed description of the manufacturing of the phase-delaying layer 100 is provided below.

The phase-delaying layer 100 is disposed over the first polarizing plate 200. The phase-delaying layer 100 changes a polarizing and/or phase-delaying characteristic of the light passing through the first polarizing plate 200 according to patterns that correspond to the polarizing spectacles used in conjunction with the display. More specifically, the light rays having the changed polarizing and/or phase-delaying characteristics are divisible by the polarizing spectacles into left and right eye associated rays and are projected through the polarizing spectacles for corresponding perception by the left and right eyes of the user. A left image portion of the light processed by the phase-delaying layer 100 is incident into a left eye of the user, and a right image portion is incident into a right eye of the user.

The phase-delaying layer 100 includes a base substrate 101 formed on the first polarizing plate 200. The phase-delaying layer 100 also includes a first pattern P1 of optically active material (e.g., light re-polarizing material) formed on the base substrate 101 and providing a respective first delaying of phase of the light polarized by the first polarizing plate 200 so as to provide light having a first further phase-delay and/or a first changed polarization direction or angle. The phase-delaying layer 100 also includes a second pattern P2 of optically active material formed on the base substrate 101 and providing a respective second delaying of phase of the light polarized by the first polarizing plate 200 so as to provide light having a second phase-delay and/or changed polarization direction or angle different from the first further phase-delayed and/or changed polarized direction. Additionally, the phase-delaying layer 100 includes a planarized organic material layer 104 formed on the first and second patterns P1 and P2. For example, a phase-delaying difference between the further phase-delays provided by the first and second pattern P1 and P2 may correspond to λ/2 where lambda is a wavelength of a visible band light passed through the display panel. For example, the first phase-delaying direction of the first pattern P1 may be a same direction as that of the first polarizing plate 200 and the further phase-delay along that direction may be λ/4, while the second phase-delay direction of the second pattern P2 may also be the same direction as that of the first polarizing plate 200 but the further phase-delay along that direction may be 3λ/4. The base substrate 101 may include a solvent-proof polymer, and may include glass.

Although the term "liquid crystal" generally means a material that has fluidic properties in that, for example, molecules of a true "liquid crystal" are free to rotate in orientation, as used herein, the term, "cured liquid crystal" means a material that in the past had fluidic properties but no longer substantially does because at least a majority of optically active molecules in the cured material have been cross polymerized such that they are not longer free to rotate. In other words, their orientations are now substantially frozen due to the curing process that had been applied to them.

The first pattern P1 includes a first cured liquid crystal layer 105, and the second pattern P2 includes the first cured liquid crystal layer 105 as well as a second cured liquid crystal layer 106. Each of the first and second patterns P1 and P2 extends continuously along a first direction D1, while; as seen in FIG. 1, the second cured liquid crystal layer 106 is discontinues along an orthogonal second direction D2. As a result, the first and second patterns P1 and P2 are alternately formed one after the other when viewed along the second direction D2, which second direction D2 is substantially perpendicular to the first direction D1. The first and second patterns may form a striped pattern. For example, the first liquid crystal layer 105 is formed as a continuous film on the first polarizing plate 200 and the second liquid crystal layer 106 is formed as a striped and thus discontinuous film on the first liquid crystal layer 105. Therefore, an area in which the second liquid crystal layer 106 is formed and an area in which the second liquid crystal layer 106 is not formed is alternately formed to be the striped pattern.

The organic material layer 104 is formed on the first and second patterns P1 and P2. The organic material layer 104 has a flat (e.g., substantially planar) upper surface. Heights of the first and second patterns P1 and P2 are different from each other, and thus a respective light absorption and/or phase delaying rate for the two is different. Thus, quality of visibility may be decreased. When the planarizing organic material 104 is formed to equalize the heights of the first and second patterns P1 and P2; the quality of visibility due to the difference between the heights of the first and second patterns P1 and P2 may be enhanced.

The organic material may include a material having a corresponding refractive index and a transmittance substantially the same as those of the first and second liquid crystal layers 105 and 106. For example, the organic material may include silicone, acrylic adhesive resin, epoxy adhesive resin, etc. The organic material may have a high hardness to prevent physical deformation due to an external pressure when the first and second liquid crystal layers 105 and 106 are formed at an outmost edge of the display apparatus.

Figure 3:
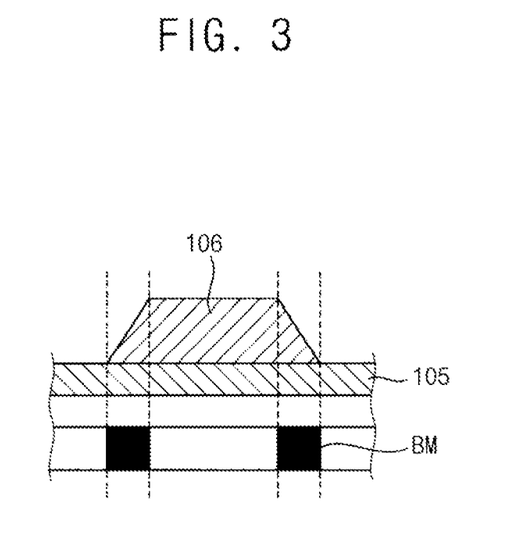
FIG. 3 is an enlarged cross-sectional view illustrating an arrangement of a light blocking pattern and edges of first and second patterns.

FIG. 3 is an enlarged cross-sectional view illustrating an arrangement of a light blocking pattern and edges of first and second patterns (P1 and P2).

Referring to FIGS. 1 to 3, as mentioned above, the first and second patterns, P1 and P2, may define a striped pattern extending along the first direction D1 over the display panel 300. For example, the first pattern P1 includes only the first cured liquid crystal layer 105, and the second pattern P2 includes both the first cured liquid crystal layer 105 and the second cured liquid crystal layer 106 formed on the first cured crystal layer 105. The second cured crystal layer 106 is formed by curing a second liquid crystal using a curing light (e.g., UV light) passed through the display panel 300 which includes the light blocking layer BM. The curing light is typically only partially blocked by edges of the light blocking layer BM when curing the liquid crystal using the light provided from one side, and thus a boundary between an area in which the second liquid crystal is cured and an area in which the second liquid crystal is not cured may be inclined with respect to the first liquid crystal layer 105. In addition, in the present example embodiment, the boundary overlaps in a self-aligned way with the light blocking layer BM of the display panel 300. Accordingly, the boundary is formed to precisely align with and overlap with the light blocking layer BM. The light is provided from a lower portion of the light blocking layer BM and the light is partially blocked by the light blocking layer BM, and thus, a boundary between the first and second patterns P1 and P2 self-alignedly overlaps with the light blocking layer BM. Accordingly, a misalignment between an area in which the light blocking layer BM is formed and a boundary area in which the light is phase-delayed in forming the phase-delaying layer 100 and the display panel 300 separately, may be solved, and an aligning reliability of the light blocking layer BM and the phase-delaying layer 100 may be enhanced.

Figure 4:
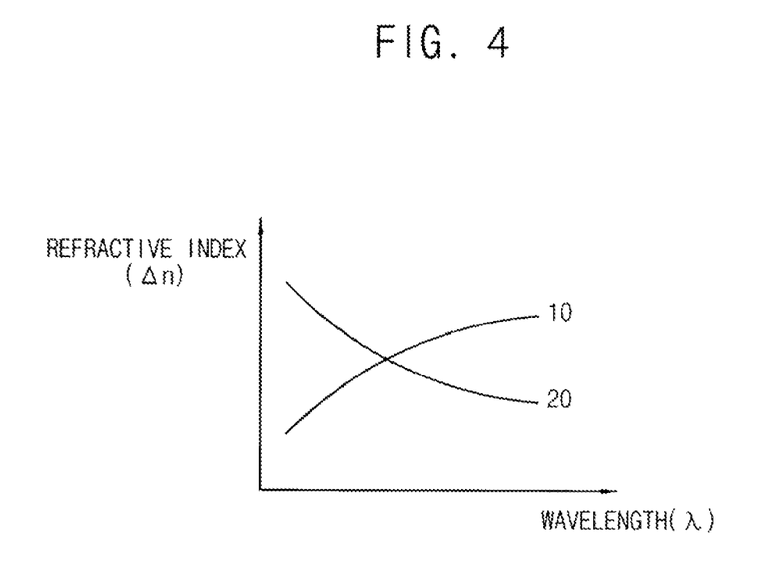
FIG. 4 is a graph illustrating a relationship between a refractive index and a wavelength.

FIG. 4 is a graph illustrating a relationship between a refractive index and a wavelength.

Referring to FIG. 4, a phase-delay index R of the light is defined as a product, $d\Delta n$ of thickness of a film etc. and the refractive index ($\Delta n$) of the respective material. In addition, the refractive index $\Delta n$ is a function of a wavelength $\lambda$, and depending on choice of material, the refractive index $\Delta n$ may increase (10) or decrease (20) according as the wavelength $\lambda$ increases. When the liquid crystal has normal wavelength dispersion denoted as 10, then the refractive index $\Delta n$ decreases according as the wavelength $\lambda$ increases. On the other hand, when the liquid crystal has inverse-wavelength dispersion denoted as 20, the refractive index $\Delta n$ increases according as the wavelength $\lambda$ increases. When the phase-delay index $R/\lambda$ of the wavelength is different according to each of the wavelengths $\lambda$, a color variation occurs corresponding to each of the wavelengths $\lambda$. Accordingly, if chosen to compensate therefor, the phase-delay index $R/\lambda$ of the wavelength may be made uniform over entire visible wavelengths (between about 400 nm and about 650 nm) to decrease the color variation. Accordingly, at least one of the first and second liquid crystal layers 105 and 106 may include the inverse-wavelength dispersion 20, but alternatively, both of the first and second liquid crystal layers 105 and 106 may include the inverse-wavelength dispersion 20.

FIGS. 5A, 5B, 5C, 5D, 5E, 5F and 5G are cross-sectional views illustrating a manufacturing process in accordance with the present disclosure for making the display apparatus in FIG. 1.

Figure 5A:
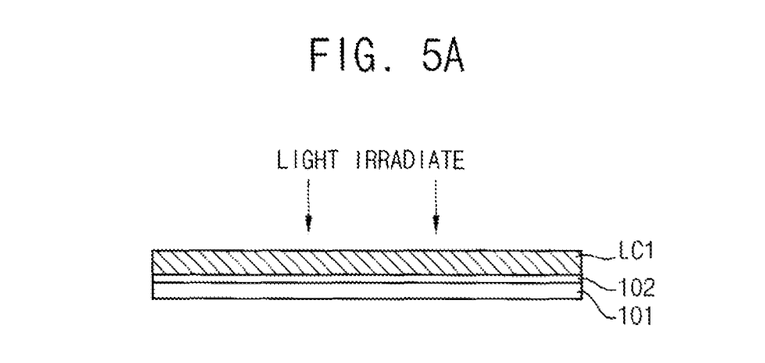
FIGS. 5A, 5B, 5C, 5D, 5E, 5F and 5G are cross-sectional views illustrating a manufacturing process of the display apparatus in FIG. 1.

Referring to FIGS. 1 and 5A, a first alignment film 102 aligned along a first alignment direction is formed on the base substrate 101. As those skilled in the art appreciate, an alignment film (e.g., 102) that is pre-aligned in a given direction can be used to subsequently align molecules of a liquid crystal fluid to a corresponding direction when no electric field is present for urging the liquid crystal molecules in a different direction. Because the base substrate 101 includes the solvent-proof material such as a solvent-tolerating polymer, and may alternatively or additionally include the glass, the base substrate 101 is not deformed by the solvent used to coat the first alignment film 102 onto the base substrate 101. After the first alignment film 102 is hardened, rubbed or otherwise given its alignment preferences, a curable first liquid crystal LC1 (of fluidic form) is coated on the first alignment film 102. The liquid crystal molecules in the fluidic form of the first liquid crystal LC1 are urged by the first alignment film 102 to align accordingly. Then a curing light (e.g., UV light) is irradiated to the first liquid crystal LC1 to thereby cure the first liquid crystal LC1 and to form the first cured liquid crystal layer 105. The curing light may be irradiated from a lower portion of the first liquid crystal LC1 to an upper portion of the first liquid crystal LC1, or may be irradiated from the upper portion of the first liquid crystal LC1 to the lower portion of the first liquid crystal LC1. Alternatively or additionally, heat may be used to cure the first liquid crystal LC1. (The heat may be provided by way of irradiating microwave energy.) The first liquid crystal LC1 may be include the liquid crystal having a chiral dopant that causes it to have a Chirality changing attribute that changes a helical twist power (HTP, $\mu m \cdot wt$ %) according to the irradiation of the light and/or other applied curing energy. The curing light may include visible light rays, ultraviolet rays and so on. When ultraviolet rays are used as the curing light, a near ultraviolet wavelength range may be used to prevent the polarizing characteristic from being changed by a polarizer of the first polarizing plate 200. Accordingly, ultraviolet rays having wavelengths in the range between about 300 nm and about 400 nm may be used.

A pre-tilted oriented film may be used instead of the base substrate 101, the first alignment film 102 and the first liquid crystal layer 105.

Figure 5B:
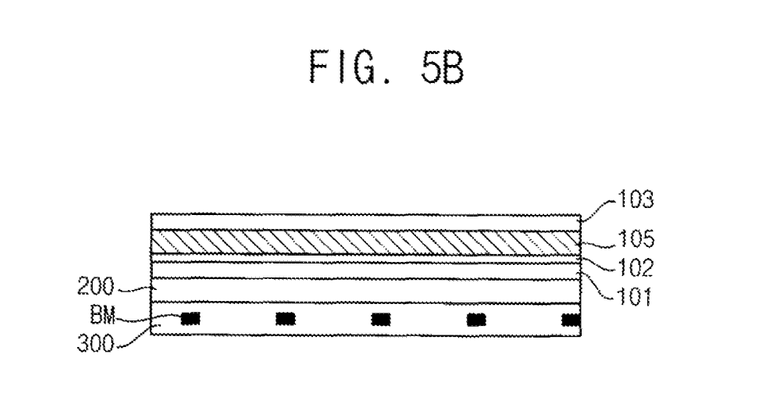

Referring to FIGS. 1 and 5B, a second alignment film 103 aligned along a second alignment direction different from the first alignment direction is formed on the first cured liquid crystal layer 105. The second alignment film 103 may be aligned at a relatively lower temperature to prevent the first liquid crystal layer 105 from being deformed by the rubbing and/or other process used to align the second alignment film 103. The lower temperature (e.g., below room temperature) is employed because the first cured liquid crystal layer 105 that has just been cured by the UV or other light is in danger of probably being deformed when exposed to a high temperature. The first and second alignment directions are different from each other, and the first alignment direction may be different from the second alignment direction by about $\lambda/2$. The first polarizing plate 200 is now attached on a lower surface of the base substrate 101, and the display panel 300 is attached on a lower surface of the first polarizing plate 200. The light blocking layer BM dividing the pixel is formed in the display panel 300. The attachment of the first polarizing plate 200 and the display panel 300 may be by means of an appropriate adhesive that will allow next-described curing radiation (e.g., UV light) to pass through. The first polarizing plate 200 and portions of the display panel 300 (except for the BM layer) are also configured to allow next-described curing radiation (e.g., UV light) to pass through.

In an alternate embodiment, the first polarizing plate 200 and the display panel 300 may be attached on the lower surface of the base substrate 101 even before the curing of the first liquid crystal LC1. However, in this alternate embodiment, because the UV-light blocking BM layer is formed in the display panel 300, when the light is irradiated from the lower portion of the display panel 300, the light is partially blocked by the light blocking layer BM, and thus the liquid crystal portion of LC1 coated in a portion overlapping with and shadowed by the light blocking layer BM may be not cured. Accordingly, in this case, the light may be alternatively or additionally irradiated from the upper portion of the first liquid crystal LC1 to the lower portion of the first liquid crystal LC1 to assure full curing of the first liquid crystal LC1.

Figure 5C:
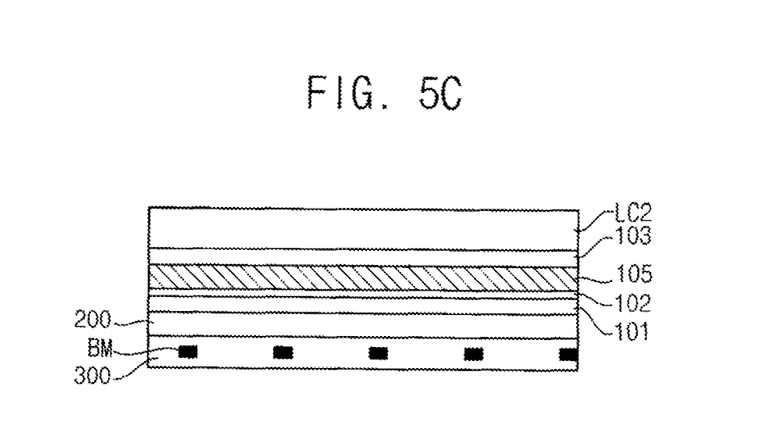

Referring to FIGS. 1 and 5C, the second liquid crystal LC2 is coated on the second alignment layer 103. The second liquid crystal LC2 may be include the liquid crystal having the chiral dopant to have the chirality changing the helical twist power (HTP, $\mu m \cdot wt$ %) according to the irradiation of the light. In addition, the second liquid crystal LC2 (after curing) defines the phase-delaying layer 100 in combination with the first cured liquid crystal layer 105 (which was formed from the first liquid crystal LC1), and thus the second liquid crystal LC2 and the first liquid crystal LC1 (before curing) may have substantially the same material. In addition, at least one of the first and second liquid crystals may include the inverse-wavelength dispersion formulation 20 (FIG. 4), but alternatively, both of the first and second liquid crystals may include the inverse-wavelength dispersion formulation 20.

Figure 5D:
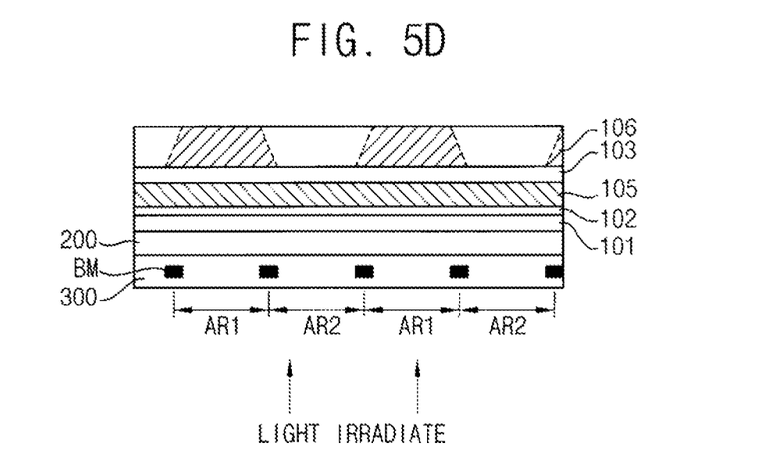

Referring to FIGS. 1 and 5D, an LCD pattern defining signal is applied to the display panel 300 to thereby create a desired, striped shuttering pattern and a curing light is irradiated through the striped shuttering pattern to the second liquid crystal LC2, to thereby partially cure the second liquid crystal LC2 is areas where the striped shuttering pattern lets the curing light through. The curing light is polarized along a polarized direction, and the polarized direction is substantially perpendicular to a polarizing direction of the first polarizing plate 200. For example, when the display panel 300 includes a twisted nematic (TN) type liquid crystal, the curing light passes through a portion of the display panel 300 in which the signal is not applied but is substantially blocked from passing through portions of the display panel 300 in which the signal is applied. More specifically, the signal is applied to display panel first areas denoted as AR1 in FIG. 5D, and is not applied to second areas denoted as AR2 (and thus the next to-be-applied curing light will be blocked by those AR2 areas of the display panel 300). The polarized direction of the light is changed substantially same as the polarizing direction of the first polarizing plate 200 when the light passes through the TN type liquid crystal of the display panel 300 in the first area AR1, and then the light passes through the first polarizing plate 200. Accordingly, only the second liquid crystal LC2 formed in the first areas AR1 is substantially cured while the second liquid crystal LC2 formed in the second areas AR2 is left substantially uncured. The polarized direction of the light is substantially same as an alignment direction of the TN-type liquid crystal, so the light passes through the TN type liquid crystal in the second area AR2 and the polarized direction of the light is substantially perpendicular to the polarizing direction of the first polarizing plate 200, and thus the light is blocked by the first polarizing plate 200. Accordingly, the second liquid crystal LC1 formed in the second area AR2 is substantially not cured. Accordingly, when the display panel 300 includes the TN type liquid crystal, the curing light passes through the first area AR1 in which the signal is not applied and the second liquid crystal LC2 formed in the first areas AR1 is cured.

When the display panel 300 alternatively includes a vertical alignment (VA) type liquid crystal, the curing light is blocked in the portion in which the signal is not applied. The signal is not applied to the second area AR2 of the display panel 300, and is applied to the first area AR1 of the display panel 300. The polarized direction of the light of the first area AR1 is changed when the light passes through the VA type liquid crystal. Accordingly, the polarized direction of the light is substantially same as the polarizing direction of the first polarizing plate 200, and the curing light passes through the first polarizing plate 200. Accordingly, the second liquid crystal LC2 formed in the first area AR1 is cured by the selectively passed through curing light. The light is not applied to the second area AR2. The polarized direction of the light is not changed when the light passes through the VA type liquid crystal, and the polarized direction is substantially perpendicular to the first polarizing plate 200, and thus the light is blocked by the first polarizing plate 200. Accordingly, the second liquid crystal LC2 formed in the second area AR2 is not cured.

In addition, the boundary between the first and second areas AR1 and AR2 may overlap with (align vertically with) the light blocking parts of the light blocking layer BM of the display panel 300. In addition, the light blocking layer BM may partially block the light. Accordingly, the second liquid crystal LC2 is partially cured, and thus the boundary between the first and second areas AR1 and AR2 overlaps with the light blocking layer BM. The light reaching the second liquid crystal LC2 decreases as a distance from the first polarizing plate 200 increases, and a cured area of the second liquid crystal LC2 decreases as the distance from the first polarizing plate 200 increases. Accordingly, the second cured liquid crystal layer 105 may have a trapezoidal shape.

Figure 5E:
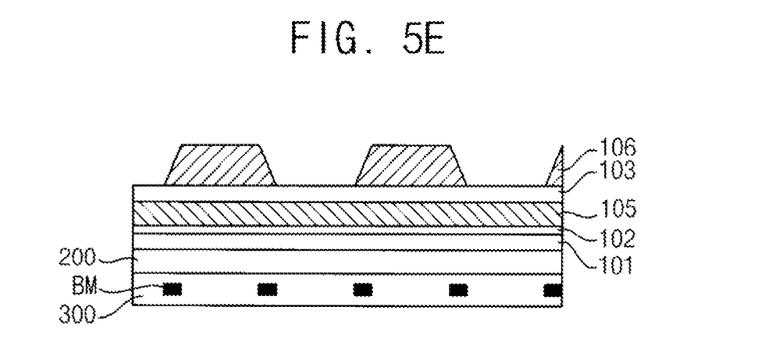

Referring to FIGS. 1 and 5E, portions of the second liquid crystal LC2 that have not been cured and are disposed in the second areas AR2 are selectively removed. An organic solvent may be used to dissolve and to selectively remove the uncured second liquid crystal LC2.

Figure 5F:
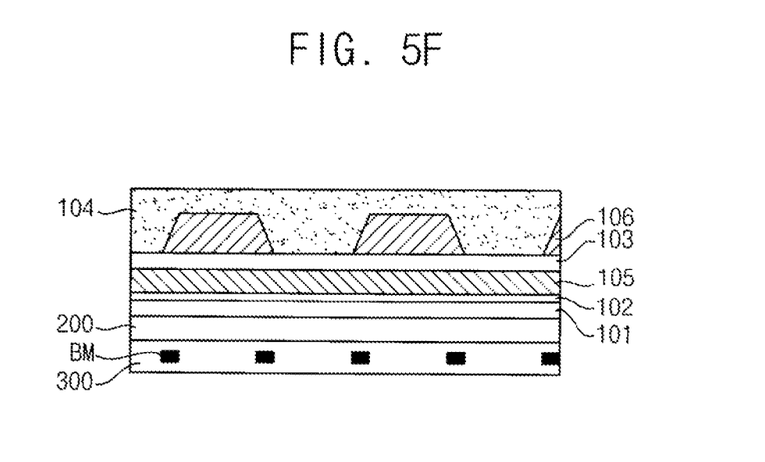
Figure 5G:
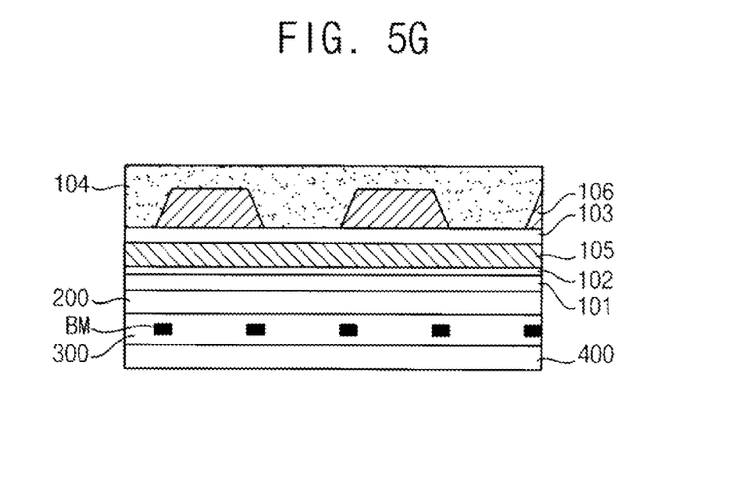

Referring to FIGS. 1, 5F and 5E, an organic material is coated over the base substrate 101 on which the first and second liquid crystal layers 105 and 106 are formed to thereby form the planarizing organic material layer 104. At this stage, the second polarizing plate 400 may be attached on the lower surface of the display panel 300.

The organic material may include the material having a refractive index and a transmittance substantially the same as those of the first and second cured liquid crystal layers, 105 and 106. In addition, the material may include a high hardness to prevent physical deformation due to an external pressure.

When the display apparatus is needed to prevent ultraviolet rays from being reflected upward into or passed upward into layers 105, 106 and/or 104, the second polarizing plate 400 may include a material absorbing or blocking such ultraviolet rays. However, if the second polarizing plate 400 absorbing or blocking the ultraviolet ray is attached before curing the first and second liquid crystals LC1 and LC2, the ultraviolet ray is blocked in using the ultraviolet for curing the first and second liquid crystals LC1 and LC2, and thus the polarizing plate 400 is attached after curing the first and second liquid crystals LC1 and LC2.

Figure 6:
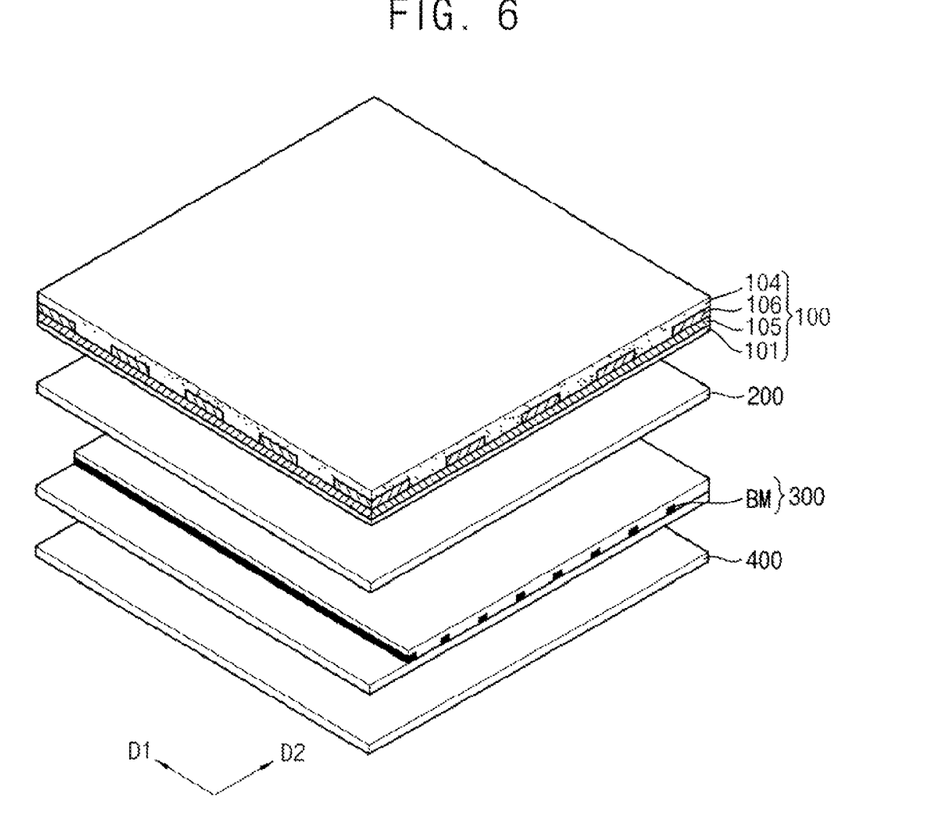
FIG. 6 is an exploded perspective view illustrating a display apparatus according to another embodiment in accordance with the present disclosure.

FIG. 6 is an exploded perspective view illustrating a display apparatus according to another example embodiment of the present disclosure.

Referring to FIG. 6, the display apparatus according to the present example embodiments is substantially the same as the display apparatus described referring to FIG. 1 except for an arrangement of the first and second patterns P1 and P2. Thus, any repetitive explanation concerning the above elements will be omitted.

As seen along the illustrated edges of phase-delaying layer 100 in FIG. 6, the first and second patterns P1 and P2 are alternately formed in checkerboard style so that there is alternation along both of the first and second directions D1 and D2. For example, the first and second patterns P1 and P2 define respective squares like those of a chess or checkers game board. More specifically, in the illustrated example, the first cured liquid crystal layer 105 is entirely formed continuously on the first polarizing plate 200 while the second cured crystal layer 106 is partially formed as for example, corresponding only to the black squares of a black and white checkerboard (except that the pattern does not have to be squares and can instead be rectangles or other tessellated geometric forms). Thus, an area in which the second cured crystal layer 106 is formed and an area in which the second cured crystal layer 106 is not formed are alternately formed along both of the first and second directions D1 and D2 to thus form a pattern corresponding to a dot pattern.

A method for manufacturing the display apparatus according to the example embodiment of FIG. 6 is substantially the same as the method described referring to FIGS. 5A to 5G except that the shuttering pattern formed by the signal applied to the display panel is that for a checkerboard or other alike tessellated pattern rather than for a striped pattern. Thus, any repetitive explanation concerning the above elements will be omitted.

More specifically and for example, when the second liquid crystal LC2 is cured, the signal applied to the display panel 300 causes light-passing areas to be alternately turned on and off along the first and second directions D1 and D2. For example, when the display panel 300 includes the TN type liquid crystal, the signal is not applied to the first area AR1 and is applied to the second area A2, and thus the second liquid crystal LC2 formed in the first area AR1 is cured. When the display panel 300 includes the VA type liquid crystal, the signal is applied to the first area AR1 and is not applied to the second area AR2, and thus the first liquid crystal LC2 formed in the first area AR1 is cured. The first and second areas AR1 and AR2 are formed as the dot pattern.

Figure 7:
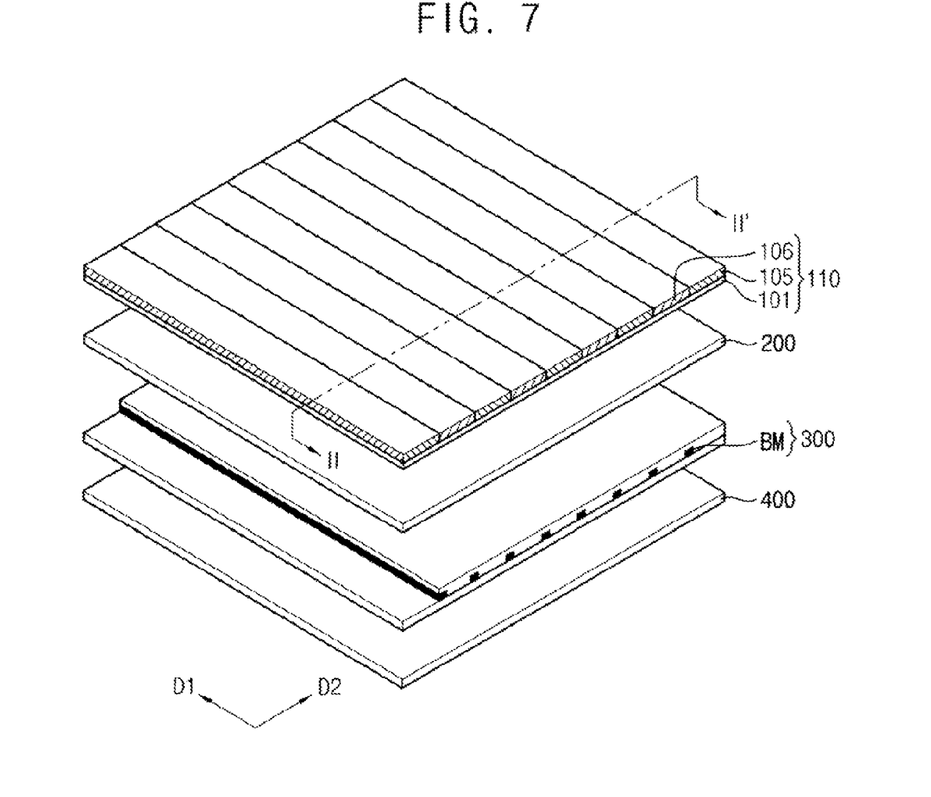
FIG. 7 is an exploded perspective view illustrating a display apparatus according to still another embodiment in accordance with the present disclosure.
Figure 8:
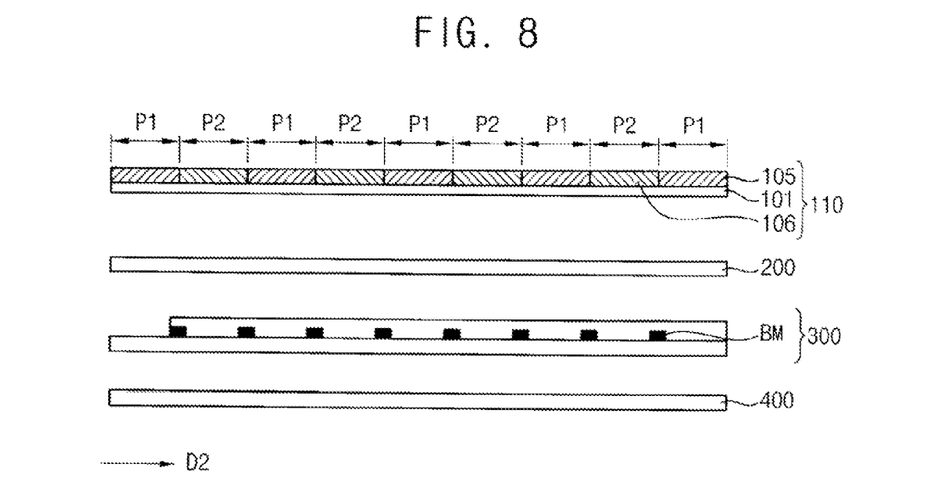
FIG. 8 is a cross-sectional view taken along a line II-II' in FIG. 7.

FIG. 7 is an exploded perspective view illustrating a display apparatus according to still another example embodiment in accordance with the present disclosure. FIG. 8 is a cross-sectional view taken along a line II-II' in FIG. 7. The display apparatus according to the present example embodiment is somewhat the same as the display apparatus described referring to FIG. 1 except that, rather than having two (or more) cured liquid crystal regions that are not coplanar with one another, in the case of FIGS. 7-8, the P1 and P2 patterns are coplanar. Thus, any repetitive explanation concerning the above elements will be omitted except to explain how the coplanar arrangement may be realized.

Referring to FIGS. 1, 7 and 8, a phase-delaying layer 110 is formed to include the base substrate 101 formed on the first polarizing plate 200, both the first pattern P1 and the second pattern P2 formed co-planar to one another on the base substrate 101. The first pattern P1 is structured for providing a corresponding first phase-delaying of light passed through and polarized by the first polarizing plate 200 according to a respective first phase-delaying direction. The second pattern P2 is structured for providing a corresponding second phase-delaying of light passed through and polarized by the first polarizing plate 200 according to a respective second phase-delaying direction different from the first phase-delaying direction. The first pattern P1 includes the first cured liquid crystal 105. The second pattern P2 includes the second cured liquid crystal 106. In the illustrated embodiment, the first pattern P1 consists of only the first cured liquid crystal 105 while the second pattern P2 consists of only the second cured liquid crystal 106 although other arrangements are possible. Each of the first and second patterns P1 and P2 includes at least one respective portion that is coplanar with the counterpart portion of the other so as to thereby define one layer alternatingly populated by the P1 and P2 portions. Since in the illustrated example, each of the first and second patterns P1 and P2 is continuously extended long the first direction D1, and is alternately formed along the second direction D2 a striped configuration so provided. In other words, the first and second patterns P1 and P2 may form the stripe pattern on the display panel 300 whose stripes extend longitudinally along the first direction D1. For example, the first and second liquid crystal layer 105 and 106 are alternately formed along the second direction D2 different from the first direction D1. The signal is applied to the display panel 300 so that the boundary between the first area AR1 in which the light passes through the first polarizing plate 200 and the second area AR2 in which the curing light does not pass through the first polarizing plate 200 overlaps with the light blocking layer BM of the display panel 300. Accordingly, the boundary between the first and second patterns P1 and P2 overlaps with the light blocking layer BM of the display panel 300.

As mention above, the first and second cured liquid crystal layers 105 and 106 may include substantially the same material but cured under different aligning conditions, and at least one of the first and second liquid crystals LC1 and LC2 may include the inverse-wavelength dispersion to decrease the color variation, but alternatively, both of the first and second liquid crystals LC1 and LC2 may include the inverse-wavelength dispersion formulation.

Accordingly, a misalignment between an area in which the light blocking layer BM is formed and a boundary area in which the light is phase-delayed in forming the phase-delaying layer 110 and the display panel 300 separately, may be solved, and an aligning reliability of the light blocking layer BM and the phase-delaying layer 100 may be enhanced.

FIGS. 9A, 9B, 9C, 9D and 9E are cross-sectional views illustrating a manufacturing process for the display apparatus in FIG. 7.

Figure 9A:
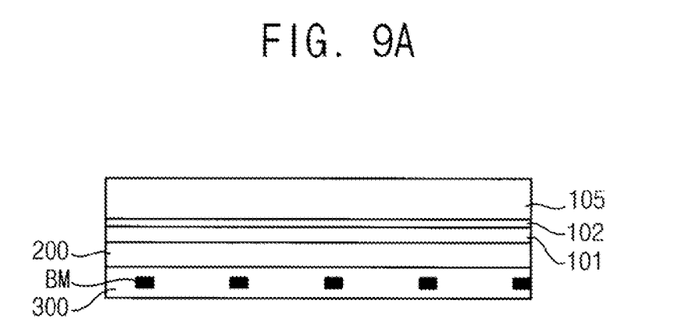
FIGS. 9A, 9B, 9C, 9D and 9E are cross-sectional views illustrating a manufacturing process of the display apparatus in FIG. 7.

Referring to FIGS. 7 and 9A, the first polarizing plate 200 is attached on the display panel 300, and the base substrate 101 is attached on the first polarizing plate 200. The first alignment film 102, aligned along a first alignment direction, is formed on the base substrate 101. The first liquid crystal LC1 is coated on the first alignment film 102.

Figure 9B:
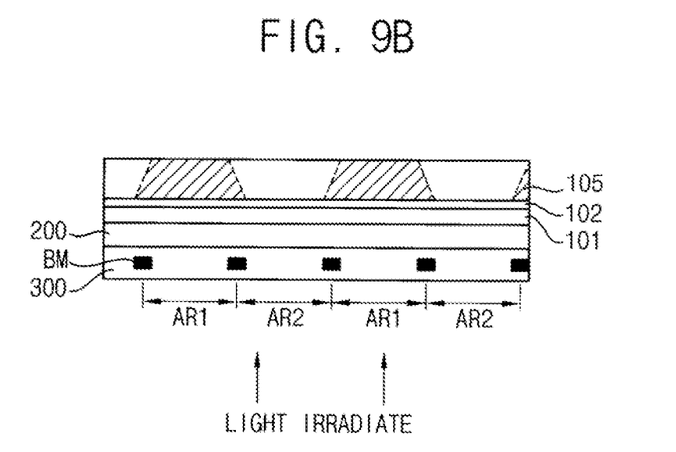

Referring to FIGS. 7 and 9B, the signal is applied to the display panel 300, and curing light is irradiated from the lower portion of the display panel 300 to thus partially cure the first liquid crystal LC1. The curing light is polarized along a polarized direction, and the polarized direction may be substantially perpendicular to the polarizing direction of the first polarizing plate 200 (which is disposed above the display panel 300). The curing light is irradiated from the lower portion of the display panel 300 and the signal is applied to the display panel 300, and thus the liquid crystal LC2 is partially cured in places where the curing light, as rotated or not by the display panel, passes through the overlying polarizing plate 200. For example, when the display panel 300 includes the TN type liquid crystal, the light passes through the portion in which the signal is not applied. The signal is not applied to the first area AR1 of the display panel 300, and is applied to the second area AR2 of the display panel 300. In the first area AR1, the polarized direction of the light is changed in passing through the TN type liquid crystal of the display panel 300, and thus the light having the polarized direction substantially same as the polarized direction of the first polarizing plate 200 passes through the first polarizing plate 200. Thus, the first liquid crystal LC1 is cured in the first area AR1. In the second area AR2 in which the signal is applied, the polarized direction of the light is maintained in passing through the TN type liquid crystal of the display panel 300, and thus the light having the polarized direction substantially perpendicular to the polarized direction of the first polarizing plate 200 is blocked by the first polarizing plate 200. Thus, the first liquid crystal LC1 is not cured in the second area AR2. Accordingly, in the display panel 300 having the TN type liquid crystal, the light reaches the first area AR1 in which the signal is not applied, and the first liquid crystal LC1 formed in the first area AR1 is cured.

When the display panel 300 includes the VA type liquid crystal, the light is blocked in the portion in which the signal is not applied. The signal is not applied to the second area AR2 of the display panel 300, and is applied to the first area AR1 of the display panel. The polarized direction of the light is changed in passing through the VA type liquid crystal, and thus, the light having the polarized direction substantially same as the polarizing direction of the first polarizing plate 200 passes through the first polarizing plate 200. Thus, the second liquid crystal LC2 formed in the first area AR1 is cured by the light passing through the first polarizing plate 200. The signal is not applied to the second area AR2. Accordingly, the light polarized to the polarized direction passes through the VA type liquid crystal, and the polarized direction is substantially perpendicular to the polarizing direction of the first polarizing plate 200, and thus the light does not pass through the first polarizing plate 200. Accordingly, the first liquid crystal LC1 formed in the second area AR2 is not cured.

In addition, the boundary between the first and second areas AR1 and AR2 may overlaps with the light blocking layer BM of the display panel 300. In addition, the light blocking layer BM may partially block the curing light. Accordingly, the first liquid crystal LC1 is only partially cured in those areas, and then the boundary of the cured liquid crystals between the first and second areas AR1 and AR2 may be inclined with respect to the base substrate 101. The area of the cured first liquid crystal LC1 decreases as the distance from the first polarizing plate 200 increases, since the light reaching the second liquid crystal LC2 decreases as the distance from the first polarizing plate 200 increases in the area overlapping with the light blocking layer BM. Accordingly, the first cured liquid crystal layer 105 may include the trapezoidal shape.

Figure 9C:
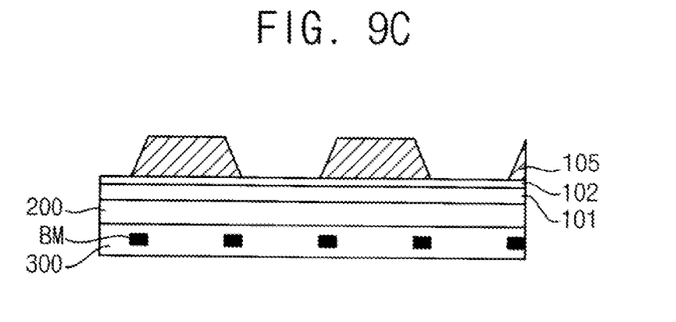

Referring to FIGS. 7 and 9C, portions of the first liquid crystal LC1 that are not cured in the second area AR2 are selectively removed. An organic solvent may be used to dissolve and to remove the uncured portions of the second liquid crystal LC2.

Figure 9D:
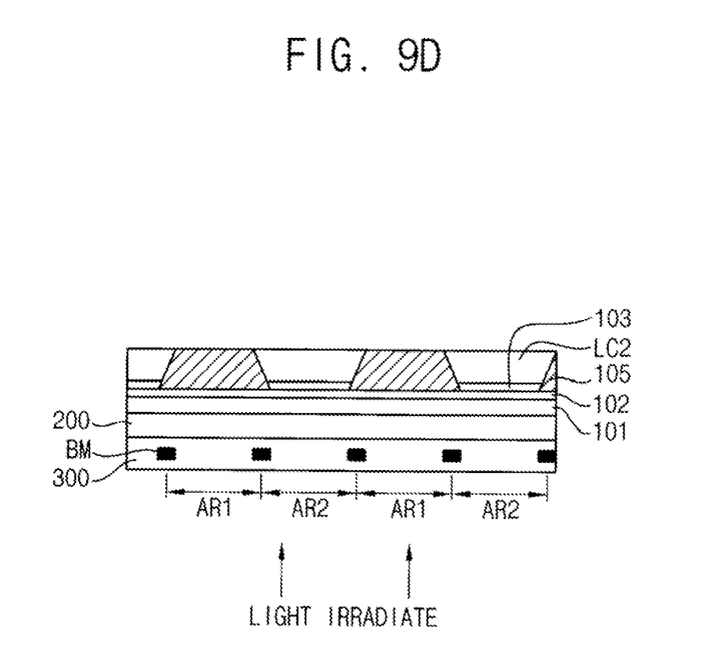

Referring to FIGS. 7 and 9D, a second alignment layer 103, aligned along a respective second alignment direction is formed in the second area AR2 of the base substrate 101 on which the first cured liquid crystal layer 105 is formed. The first and second alignment directions are different from each other, and the first alignment direction may be different from the second alignment direction by about λ/2. Next, a second liquid crystal LC2 is coated on the second alignment layer 103. Then, a curing light (e.g., UV) is irradiated from the lower portion of the display panel 300 to partially cure the second liquid crystal LC2.

To form the boundary between the first and second liquid crystal layers 105 and 106 more clearly, the signal is partially applied to the display panel 300 when the light is irradiated from the lower portion of the display panel 300, and thus the second liquid crystal LC2 is partially cured. For example, the signal is applied reversely compared to forming the first liquid crystal layer 105. For example, when the display panel 200 includes the TN type liquid crystal, the signal is applied to the first area AR1 and is not applied to the second area AR2. Thus, the second liquid crystal LC2 in the first area AR1 is not cured and the first liquid crystal CK1 in the second area AR2 is cured. Alternatively, the display panel 300 includes the VA type liquid crystal; the signal is not applied to the first area A1 of the display panel 300, and is applied to the second area A2 of the display panel 300. Accordingly, the second liquid crystal LC2 formed in the first area AR1 is not cured, and the first liquid crystal LC1 formed in the second area AR2 is cured. Portions of the second liquid crystal LC2 that are not cured in the first area AR1 are selectively removed. The organic solvent dissolves the second liquid crystal LC2.

Figure 9E:
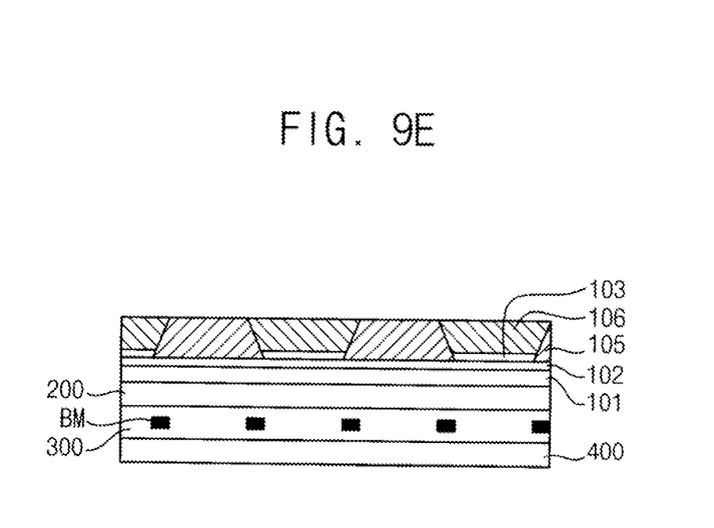

Referring to FIGS. 7 and 9E, after curing of the second liquid crystal LC2 to thus form the cured second pattern P2 (106), the second (lower) polarizing panel 400 is attached to the lower surface of the display panel 300. When the display apparatus is needed to prevent ultraviolet rays from being reflected, the second polarizing plate 400 is formed after curing the first and second liquid crystals LC1 and LC2, and the second polarizing plate 400 may include a material absorbing and/or blocking ultraviolet rays. When the display panel 300 absorbs the ultraviolet ray, the liquid crystal is hard to be cured by the ultraviolet ray.

Figure 10:
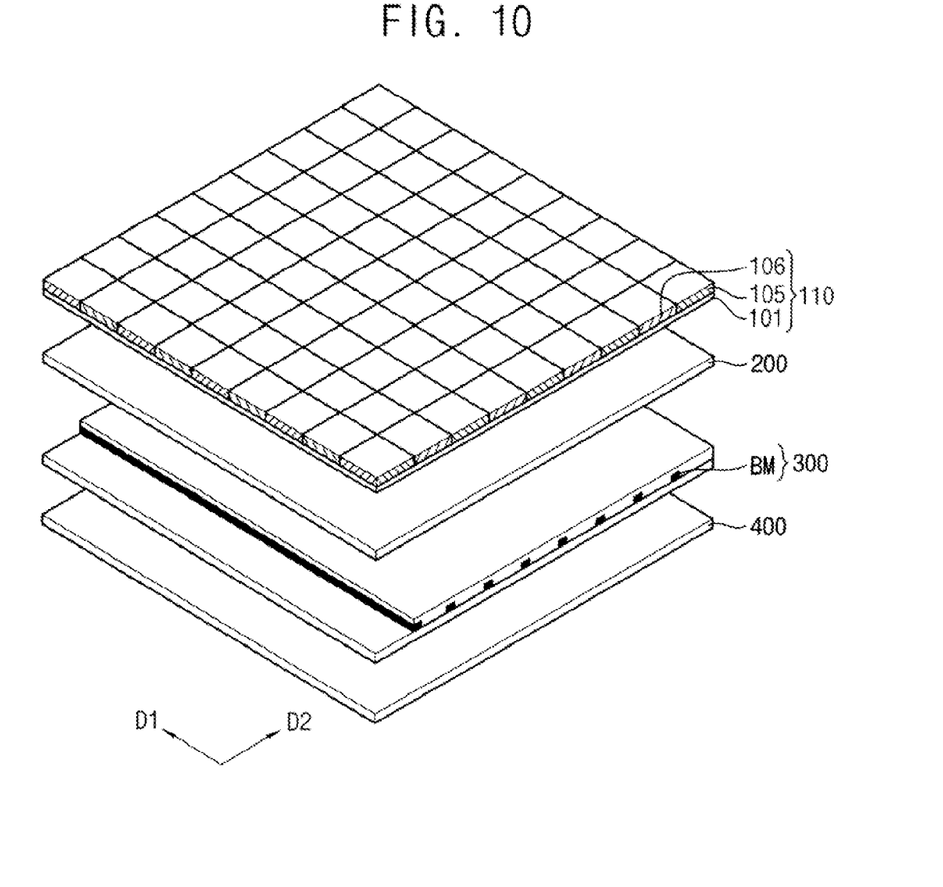
FIG. 10 is an exploded perspective view illustrating a display apparatus according to still another embodiment in accordance with the present disclosure.

FIG. 10 is an exploded perspective view illustrating a display apparatus according to still another example embodiment.

Referring to FIG. 10, the display apparatus according to the present example embodiment is substantially the same as the display apparatus described referring to FIG. 7 except for the spatial arrangement of the coplanar first and second patterns P1 and P2. Thus, any repetitive explanation concerning the above elements will be omitted.

Referring to FIG. 10, the first pattern P1 includes the first liquid crystal layer 105, the second patterns P2 includes the second liquid crystal layer 106, and each of the first and second pattern P1 and P2 is formed as part of one layer. The first pattern P1 and the second pattern P2 are alternately formed along the first and second directions D1 and D2. For example, the first and second patterns P1 and P2 correspond to the black and white squares of a checkerboard except that patterns P1 and P2 do not have to be squares. The first and second crystal layers 105 and 106 are alternately formed along the first direction D1 substantially perpendicular to the second direction D2.

A method for manufacturing the display apparatus is substantially the same as the method described referring to FIGS. 9A to 9E. Thus, any repetitive explanation concerning the above elements will be omitted.

For example, when the first and second liquid crystals LC1 and LC2 are cured, the signal is alternately turned on and off along the first and second directions D1 and D2 in the display panel 300. For example, when the display panel 300 includes the TN type liquid crystal, the signal is not applied to the first area AR1 and is applied to the second area AR2, and thus the first liquid crystal LC1 formed in the first area A1 is cured. When the display panel 300 includes the VA type liquid crystal, the signal is applied to the first area AR1 and in not applied to the second area AR2, and thus the second liquid crystal LC2 formed in the second area AR2 is cured. The first and second areas AR1 and AR2 form the checkerboard pattern.

In addition, when the second liquid crystal LC2 is cured, the signal is reversely turned on and off compared to curing the first liquid crystal LC1, and is applied to the display panel 300. For example, the signal alternately turned on and off along the first and second directions D1 and D2 in curing the first liquid crystal LC1 is turned off and on and is applied to the display panel 300. For example, an ON signal is applied to the second area AR2 except for the first area AR1, and the light which is polarized along the polarized direction and is irradiated from the lower portion of the display panel 300 passes through the display panel 300 in the second area AR2, and then the light passes through the first polarizing plate 200. Accordingly, the second liquid crystal LC2 formed in the second area AR2 is cured. Then, the second liquid crystal LC2 which is not cured is removed, and thus the second pattern is formed. Accordingly, the first and second patterns P1 and P2 are alternately formed along the first and second direction D1 and D2, which means the checkerboard pattern.

According to the present disclosure of invention, a selectively hardenable (polymerizable) liquid crystal is coated on top of a partially operable display panel (one having a preformed black matrix (BM)) and a display panel shuttering signal is applied to thereby form a shuttering pattern for to be used, curing radiation (e.g., UV light rays). Thereafter, and the liquid crystal is cured using a curing light passing through the display panel and the first polarizing plate disposed thereabove. Thus, the phase-delaying layer is formed and is self aligned to the pixel areas and the black matrix of the display panel. Accordingly, additional attaching process between the phase-delaying layer and the display panel is unnecessary, and a spatial crosstalk between display panel and the phase delaying-delaying layer may be decreased.

In addition, the light is irradiated from the lower portion of the display panel to cure the liquid crystal, and the misalignment of the phase-delaying layer and the display panel may be decreased.

While the present disclosure of invention has been particularly shown and described with reference to example embodiments thereof, it will be understood by those of ordinary skill in the art and in view of the foregoing that various changes in form and details may be made therein without departing from the spirit and scope of the present teachings.

What is claimed is:

1. A display apparatus comprising:
    a display panel having at least one of a matrix of pixels and a black matrix (BM); and
    a phase-delaying layer disposed on the display panel, the phase-delaying layer including:
        a base substrate, and
        a first light-changing pattern (P1) and a second light-changing pattern (P2), wherein at least one of the first and second light-changing patterns (P1, P2) is patterned in a self aligning manner relative to at least one of the matrix of pixels and the black matrix (BM) of the display panel;
    wherein the base substrate is disposed above the display panel,
    wherein the first pattern (P1) is formed on top of the base substrate, the first pattern (P1) is structured to provide a corresponding first phase-delaying effect to visible light passing therethrough, and the first pattern (P1) includes a respective first cured liquid crystal,
    wherein the second pattern (P2) is disposed adjacent to the first pattern (P1) and the second pattern (P2) is structured to provide a corresponding second phase-delaying effect to visible light passing therethrough, the second phase-delaying effect being different from the first phase-delaying effect, the second pattern (P2) including a respective second cured liquid crystal.

2. The display apparatus of claim 1, wherein a boundary between the first and second patterns is self-aligned to a light blocking feature of the black matrix (BM).

3. The display apparatus of claim 1, further comprising:
    a polarizing plate structured to polarize incident light and disposed under the base substrate.

4. The display apparatus of claim 1, wherein the first and second patterns form a striped pattern or another alternating and tessellated pattern that covers a display area of the display panel.

5. The display apparatus of claim 4, wherein the first pattern includes only the first cured liquid crystal, while the second pattern includes both of the first cured liquid crystal and the second cured liquid crystal.

6. The display apparatus of claim 5, wherein at least one of the first and second cured liquid crystals has an inverse-wavelength dispersion characteristic.

7. The display apparatus of claim 5, wherein the phase-delaying layer further includes an organic material having a flat upper surface formed on top of the first and second cured liquid crystals.

8. The display apparatus of claim 4, wherein the first pattern includes a first liquid crystal layer, the second pattern includes a second liquid crystal layer, and the first and second layers are formed as a substantially same layer.

9. The display apparatus of claim 1, wherein the first pattern (P1) has respective first phase-delaying direction that is different from a respective second phase-delaying direction of the second pattern (P2) and the first and second phase-delaying directions are separated from one another by an amount corresponding to about $\lambda/2$.

10. A method for manufacturing a display apparatus, the method comprising:
    coating a curable liquid crystal on a base substrate;
    disposing a display panel under the base substrate;
    irradiating a curing light from a lower portion of the display panel to the display panel;
    driving the display panel with first and second areas divided from each other by applying a signal to the display panel, and transmitting the curing light through the first and second areas selectively, whereby said combination of driving the display panel and irradiating with the curing light causes a selective curing of the curable liquid crystal due to selective passing of the curing light through one but not the other of the first and second areas of the display panel, the selective curing forming a corresponding first cured liquid crystal layer; and
    removing uncured liquid crystal material from the other of the first and second areas.

11. The method of claim 10, wherein the display panel further comprises a light blocking layer providing selective light-blocking between adjacent pixels of the display panel.

12. The method of claim 11, wherein curing light that is incident to the display panel is polarized to a direction substantially perpendicular to a polarizing direction of the polarizing plate and the signal applied to the display panel causes selective change of polarization to areas of the incident curing light where the areas are self-aligned to pixels of the display panel.

13. The method of claim 10, further comprising:
    disposing a polarizing plate under the base substrate.

14. The method of claim 10, wherein the first and second areas are adjacent to each other, and form a stripe pattern or a dot pattern.

15. The method of claim 10, wherein coating the liquid crystal on the base substrate comprises:
    forming a first alignment layer aligned along a first alignment direction on the first base substrate; and
    coating the liquid crystal on the first alignment layer.

16. The method of claim 15, further comprising:
    forming a second alignment layer aligned along a second alignment direction different from the first alignment direction;
    coating a liquid crystal on the second alignment layer; and
    irradiating the curing light at different times to the liquid crystal of the first and second areas, to thereby cure the respective liquid crystals of the first and second areas at different times and form different first and second light-changing patterns,
    wherein the formed first and second patterns are adjacent to each other.

17. The method of claim 16, wherein at least one of the first and second liquid crystals has an inverse-wavelength dispersion characteristic.

18. The method of claim 16, further comprising coating an organic material on the first and second cured liquid layers and providing the organic material with a flat upper surface.

19. The method of claim 15, further comprising:
    forming a second alignment layer aligned along a second alignment direction different from the first alignment direction on the base substrate on which the first liquid crystal layer is formed;
    coating the liquid crystal on the second alignment layer;
    irradiating curing light from the lower portion of the display panel to the display panel;

driving the panel with the first and second areas divided from each other by applying the signal to the display panel, and transmitting the curing light through the first and second areas selectively; curing the liquid crystal using the light passing through the second area to form a second liquid crystal layer; and removing the uncured liquid crystal of the first area which is not cured by the curing light, wherein the first liquid crystal layer formed in the first area is formed as a first pattern, the second crystal layer formed in the second area is formed as a second pattern, and the first and second patterns are adjacent to each other.

20. The method of claim 19, wherein at least one of the first and second liquid crystal layers has an inverse-wavelength dispersion characteristic.

\* \* \* \* \*